US011446871B2

United States Patent
Feller et al.

(10) Patent No.: US 11,446,871 B2
(45) Date of Patent: Sep. 20, 2022

(54) RESIN CASSETTES WITH LIQUID INHIBITOR BEDS TO MINIMIZE GHOSTING DURING ADDITIVE MANUFACTURING

(71) Applicant: Carbon, Inc., Redwood City, CA (US)

(72) Inventors: Bob E. Feller, San Mateo, CA (US); R. Griffin Price, Redwood City, CA (US)

(73) Assignee: Carbon, Inc., Redwood City, CA (US)

( * ) Notice: Subject to any disclaimer, the term of this patent is extended or adjusted under 35 U.S.C. 154(b) by 27 days.

(21) Appl. No.: 17/038,036

(22) Filed: Sep. 30, 2020

(65) Prior Publication Data
US 2021/0094231 A1    Apr. 1, 2021

Related U.S. Application Data

(60) Provisional application No. 62/907,995, filed on Sep. 30, 2019.

(51) Int. Cl.
*B29C 64/259* (2017.01)
*B29C 64/124* (2017.01)
(Continued)

(52) U.S. Cl.
CPC .......... *B29C 64/259* (2017.08); *B29C 64/124* (2017.08); *B29C 64/232* (2017.08);
(Continued)

(58) Field of Classification Search
CPC ... B29C 64/124; B29C 64/129; B29C 64/135; B29C 64/259; B29C 64/264;
(Continued)

(56) References Cited

U.S. PATENT DOCUMENTS

2015/0360419 A1* 12/2015 Willis ............... B29C 64/135
                                                    425/174.4
2016/0046075 A1*  2/2016 DeSimone ......... B29C 64/129
                                                    425/114
(Continued)

*Primary Examiner* — Joseph S Del Sole
*Assistant Examiner* — Jamel M Nelson
(74) *Attorney, Agent, or Firm* — Myers Bigel, P.A.

(57) ABSTRACT

An apparatus for manufacturing an object from a light polymerizable resin includes (a) an carrier platform on which an object can be produced; (b) a resin cassette configured for carrying a light-polymerizable resin, said cassette including a light-transmissive window having a liquid inhibitor supply bed therein, said supply bed having an inlet and an outlet; (c) a light source positioned beneath said resin cassette and configured for projecting an enlarged image through said window; (d) a drive operatively associated with said resin cassette and said carrier platform; (e) a gas exchanger comprising a liquid side, a gas side, and an oxygen permeable barrier therebetween; said liquid side having an inlet and an outlet, with said supply bed inlet connected to said liquid side outlet, and said supply bed outlet connected to said liquid side inlet; (f) an oxygen carrying liquid in said liquid inhibitor supply bed and said gas exchanger liquid side; and (g) a pump operatively associated with said supply bed and said gas exchanger liquid side for circulating said oxygen carrying liquid therebetween; and (h) an oxygen gas source operatively associated with said gas exchanger gas side.

11 Claims, 4 Drawing Sheets

(51) Int. Cl.
  *B33Y 10/00* (2015.01)
  *B33Y 30/00* (2015.01)
  *B29C 64/264* (2017.01)
  *B29C 64/393* (2017.01)
  *B29C 64/232* (2017.01)
  *B29C 64/245* (2017.01)
  *B33Y 50/02* (2015.01)

(52) U.S. Cl.
  CPC .......... *B29C 64/245* (2017.08); *B29C 64/264* (2017.08); *B29C 64/393* (2017.08); *B33Y 10/00* (2014.12); *B33Y 30/00* (2014.12); *B33Y 50/02* (2014.12)

(58) Field of Classification Search
  CPC ... B29C 64/232; B29C 64/245; B29C 64/393; B33Y 10/00; B33Y 30/00; B33Y 50/02
  See application file for complete search history.

(56) References Cited

U.S. PATENT DOCUMENTS

2018/0370148 A1* 12/2018 Sekine .................. B29C 64/129
2019/0017645 A1* 1/2019 Fiedler .................... B64G 1/58

* cited by examiner

RESIN CASSETTES WITH LIQUID INHIBITOR BEDS TO MINIMIZE GHOSTING DURING ADDITIVE MANUFACTURING

RELATED APPLICATIONS

This application claims priority to U.S. Provisional Application Ser. No. 62/907,995, filed Sep. 30, 2019, the disclosure of which is incorporated herein in its entirety.

FIELD OF THE INVENTION

The present invention concerns apparatus for producing objects by additive manufacturing.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin on the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606).

In many manufacturing environments employing advanced stereolithography techniques, there is a delicate balance between part production accuracy, part production speed, chemical reaction requirements, and chemical reaction consequences, during the production step. Optimizing one parameter, such as accuracy, may be deleterious to another parameter such as production speed. Accordingly, there remains a need for improvements in advanced stereolithography processes and apparatus.

SUMMARY OF THE INVENTION

We have found that, in bottom-up stereolithography apparatus that feed a polymerization inhibitor such as oxygen through the light transmissive window, the inhibitor supply bed in the window can cause reflections, refractions, or both reflections and refractions, of the light image as it passes through the window, leading to a decrease in part accuracy. This phenomenon may be referred to as reflective or refractive ghosting, or simply "ghosting." By supplying an oxygen-carrying liquid in these channels, rather than an oxygen enriched gas, ghosting arising from reflection and/or refraction of light in the window can be reduced.

In some embodiments, an apparatus for manufacturing an object from a light polymerizable resin includes (a) an optionally but preferably detachable carrier platform on which an object can be produced (e.g., a carrier platform removably coupled to a platform mount); (b) a resin cassette configured for carrying a light-polymerizable resin, said cassette including a light-transmissive window, said window having a liquid inhibitor supply bed therein, said supply bed having an inlet and an outlet; (c) a light source positioned beneath said resin cassette and configured for projecting an enlarged image through said window; (d) a drive operatively associated with said resin cassette and said carrier platform and configured for advancing said carrier platform and said resin cassette away from one another; (e) a gas exchanger comprising a liquid side, a gas side, and an oxygen permeable barrier therebetween; said liquid side having an inlet and an outlet, with said supply bed inlet connected to said liquid side outlet, and said supply bed outlet connected to said liquid side inlet; (f) an oxygen carrying liquid in said liquid inhibitor supply bed and said gas exchanger liquid side; and (g) a pump (e.g., an optionally reversable pump) operatively associated with said supply bed and said gas exchanger liquid side for circulating said oxygen carrying liquid therebetween; and (h) an oxygen gas source (e.g., an oxygen concentrator) operatively associated with said gas exchanger gas side.

In some embodiments, the oxygen carrying liquid is a non-aqueous, or organic, liquid (e.g., a fluorocarbon, a silicone oil).

In some embodiments, the supply bed comprises a plurality of channels.

In some embodiments, the window comprises a sandwich of at least top portion an intermediate portion, and a bottom portion, and said supply bed is formed in said intermediate portion.

In some embodiments, the window bottom portion comprises glass, sapphire, quartz, or transparent aluminum (ALON).

In some embodiments, the top portion comprises a polymer (e.g., an oxygen-permeable polymer such as an amorphous fluoropolymer), optionally with said fluorophore dispersed therein.

In some embodiments, the intermediate portion comprises a second polymer layer, such as a polydimethylsiloxane (PDMS) layer.

In some embodiments, the window, the pump, and the gas exchanger are operatively associated with one another by a liquid flow circuit. The apparatus further includes (i) a flow reversal valve operatively associated with said liquid flow circuit and configured to reverse the flow of oxygen carrying liquid through said supply bed; and/or (j) a heater, a cooler, or both a heater and a cooler operatively associated with said liquid flow circuit and configured to heat and/or cool said oxygen carrying liquid; and/or (k) a bleader valve or bubble trap operatively associated with said liquid flow circuit.

In some embodiments, the resin cassette further comprising a circumferential frame carried by and surrounding said window, wherein said pump and said gas exchanger are carried by said frame.

In some embodiments, a chassis is operatively connected to said carrier platform, said light source, said drive, and said oxygen gas source, to which chassis said resin cassette can be removably mounted, with said oxygen gas source operatively associated with said gas exchanger gas side through sealable connectors.

In some embodiments, a method of making an object from a light polymerizable resin (21) and a data file (e.g., a CAD file, an .stl file, etc.) includes: (a) filling a resin cassette as described herein with said resin; and (b) producing said object from said data file and said resin by intermittently and/or continuously exposing said resin to an enlarged image (e.g., that is spatially and temporally modulated) from said light source to photopolymerize said resin, while advancing said carrier platform and said resin cassette away from one another.

In some embodiments, the resin comprises a dual cure resin.

In some embodiments, a resin cassette for manufacturing an object from a light polymerizable resin includes (a) a light-transmissive window, said window having a liquid inhibitor supply bed therein, said supply bed having an inlet and an outlet; (b) a circumferential frame surrounding said window, said window and frame together forming a well configured to receive a light polymerizable resin; (c) a gas exchanger carried by said frame, said gas exchanger comprising a liquid side, a gas side, and an oxygen permeable barrier therebetween; said liquid side having an inlet and an outlet, with said supply bed inlet connected to said liquid side outlet, and said supply bed outlet connected to said liquid side inlet; (d) an oxygen carrying liquid in said liquid inhibitor supply bed and said gas exchanger liquid side; and (e) a pump carried by said frame, said pump operatively associated with said supply bed and said gas exchanger liquid side for circulating said oxygen carrying liquid therebetween; and (f) gas connectors on said frame and operatively associated with said gas exchanger gas side for connecting said gas side to an oxygen gas source (e.g., an oxygen concentrator).

In some embodiments, the pump comprises a pneumatically actuated pump.

Moore, et al., US Patent Application Pub. No. US 2018/0133959 (May 17, 2018), suggests at paragraph 177 that oxygen inhibitors in a CLIP apparatus may be dissolved in a fluorinated fluid, but does not suggest a way to reduce the volume of fluorinated liquid required by providing a means to replenish oxygen in that liquid.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
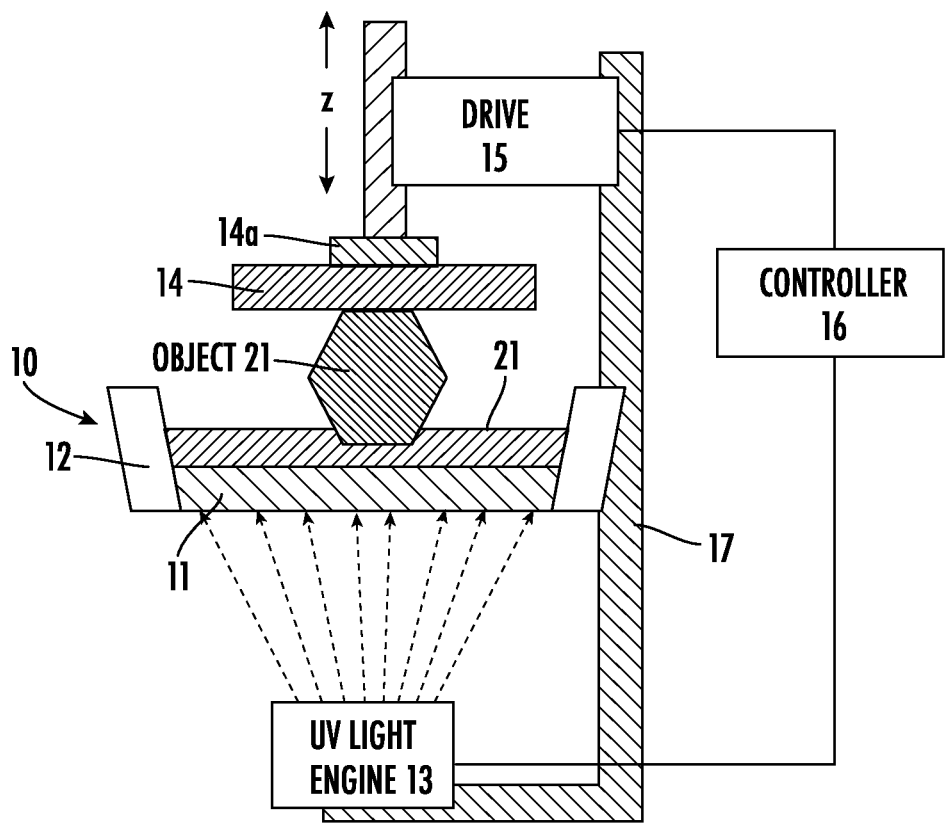
FIG. 1 is a schematic illustration of one embodiment of an apparatus as described herein, showing as dashed lines the divergent chief rays of an image projected from the light source.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

"Oxygen-carrying liquid" as used herein may be aqueous (e.g., saline solution) or non-aqueous, with non-aqueous liquids currently preferred. Suitable non-aqueous oxygen carrying liquids include, for example, silicone oils and liquid fluorocarbons, some of which are also known for and used for as coolants (or heat transfer agents) for electrical and electronic circuits. Particular examples include, but are not limited to, perfluoroalkanes having 6 to 20 carbon atoms, perfluorocycloalklanes having 5 to 14 carbon atoms which may be substituted by perfluoroalkyl groups having 1 to 5 carbon atoms, perfluorotetrahydrofurans substituted by perfluoroalkyl groups having 1 to 5 carbon atoms, perfluorotetrahydropyrans substituted by perfluoroalkyl groups having 1 to 5 carbon atoms, perfluoroadamantanes which may be substituted by perfluoroalkyl groups having 1 to 5 carbon atoms, and tertiary amino group-substituted products of the above fluorocarbons. Specific examples of the perfluoroalkanes having 6 to 20 carbon atoms are linear or branched perfluoro-n-heptane, perfluorooctane and perfluorononane. Specific examples of the perfluorocycloalkanes having 5 to 14 carbon atoms which may be substituted by perfluoroalkyl groups having 1 to 5 carbon atoms are perfluoro-1-trimethyldecalin and perfluorodecalin. Specific examples of the perfluorofurans or perfluorotetrahydrofurans substituted by perfluoroalkyl groups having 1 to 7 carbon atoms are perfluoro-2-butylperfluorofuran, perfluoro-2-butyltetrahydrofuran, perfluoropentyl perfluorofuran, perfluoropentyl tetrahydrofuran, perfluorohexyl perfluorofuran, perfluorohexyl tetrahydrofuran, perfluoroheptyl perfluorofuran, and perfluoroheptyl tetrahydrofuran. Specific examples of the perfluorfurans or tetrahydropyrans substituted by perfluoroalkyl groups having 1 to 6 carbon atoms include perfluorobutyl perfluoropyran, perfluorobutyl tetrahydropyran, perfluoropentyl perfluoropyran, perfluoropentyl tetrahydropyran, perfluorohexyl perfluoropyran, and perfluorohexyl tetrahydropyran. Specific examples of the perfluoroadamantanes which may be substituted by perfluoroalkyl groups having 1 to 5 carbon atoms are perfluoroadamantane, perfluoromethylperfluoroadamantane, perfluorodimethylperfluoroadamantane, perfluoromethylperfluoroethylperfluoroadamantane and perfluorodimethyl-perfluoroadamantane. Examples of the tertiary amino group substituted products of these fluorocarbons are perfluorotributylamine-substituted products and perfluoro-N-methylmorpholine substituted products of these fluorocarbon. The foregoing may be used singly or in combination with one another. Particular fluorocarbon liquids include those commercially available as 3M™ FLUORINERT™ electronic liquid FC-40. See U.S. Pat. No. 5,180,676.

1. Resin and Additive Manufacturing Apparatus.

Resins for additive manufacturing are known and described in, for example, U.S. Pat. Nos. 9,211,678; 9,205, 601; and 9,216,546 to DeSimone et al. In addition, dual cure resins useful for carrying out some embodiments of the present invention are known and described in U.S. Pat. Nos. 9,676,963, 9,453,142 and 9,598,606 to Rolland et al., and in U.S. Pat. No. 10,316,213 to Arndt et al. Particular examples of suitable dual cure resins include, but are not limited to, Carbon Inc. medical polyurethane, elastomeric polyurethane, rigid polyurethane, flexible polyurethane, cyanate ester, epoxy, and silicone dual cure resins, all available from Carbon, Inc., 1089 Mills Way, Redwood City, Calif. 94063 USA.

Apparatus for carrying out bottom-up stereolithography, which can be adapted or improved as described herein, are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, S Patent Application Pub. No. US 2017/0129167 (May 11, 2017). B. Feller, US Pat App. Pub. No. US 2018/0243976 (published Aug. 30, 2018); M. Panzer and J. Tumbleston, US Pat App Pub. No. US 2018/0126630 (published May 10, 2018); and K. Willis and B. Adzima, US Pat App Pub. No. US 2018/0290374 (Oct. 11, 2018).

2. Image Projection and Ghosting

Figure 2:
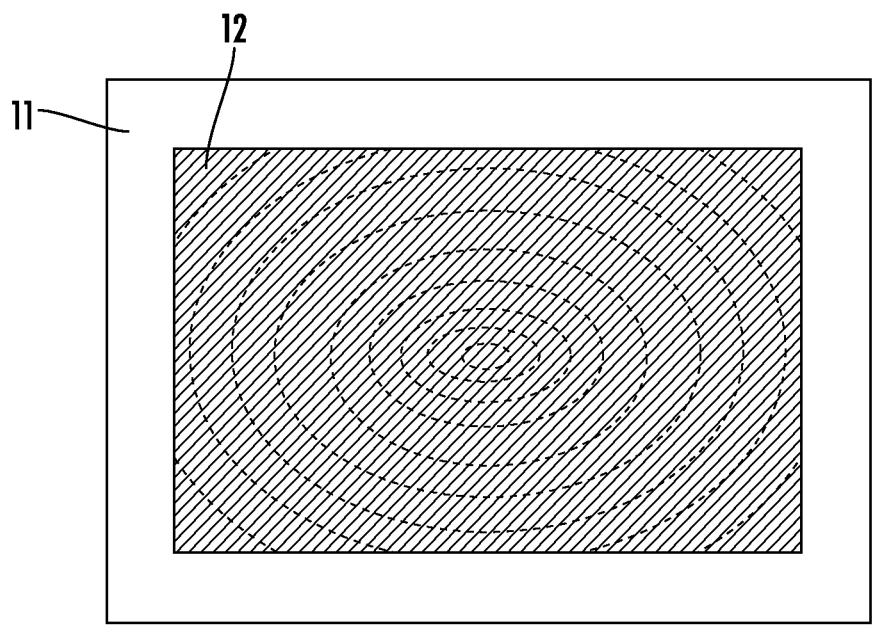
FIG. 2 is a top plan view of the resin cassette in FIG. 1, showing (as nested elliptical dashed lines) the increasingly divergent chief rays of an image projected from the light source.
Figure 3:
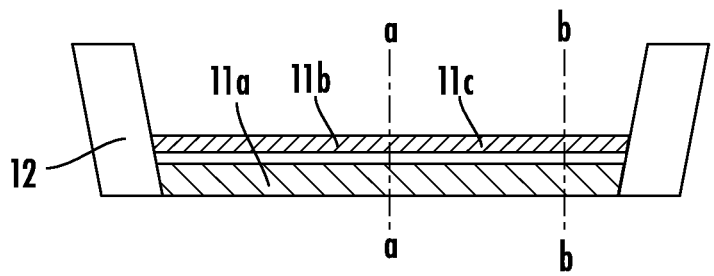
FIG. 3 is a side schematic; view of one embodiment of a resin cassette for use as described herein.
Figure 4:
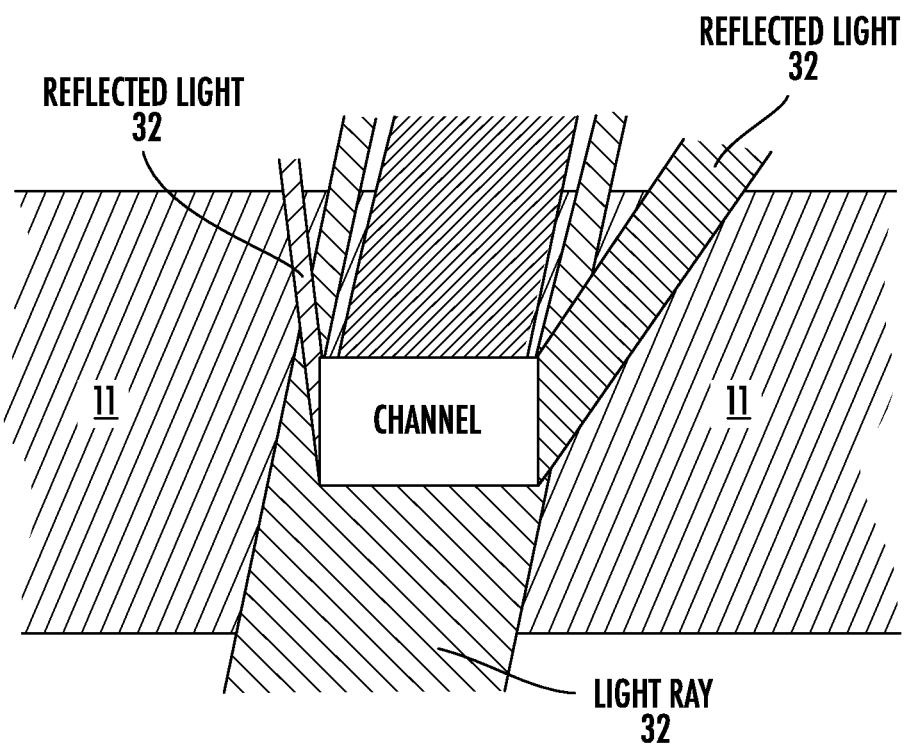
FIG. 4 shows light refracted and reflected by a channel (c) having a quadrangular (specifically, a rectangular) profile in a typical resin cassette, leading to substantial "ghosting" of the image when projected into the resin.

As can be seen from FIGS. 1-3, when an enlarged image is projected from a light source (such as an image projected off of a micromirror array or an image formed by projection through a liquid crystal display), the principal rays of the image diverge from substantially perpendicular at the point where they encounter the window (e.g., at point a-a in FIG. 3) to an increasingly greater angle of incidence (e.g., at point b-b in FIG. 3). We find that, when the window includes internal features such as rectangular channels, the principal rays of the image can increasingly refract, reflect, or both refract and reflect, off of the channel in a progressively increasing fashion along the channel as the rays increasingly diverge from the perpendicular point (e.g., as shown in FIG. 4, in which the reflected light (32) from a light ray (31) is at a different angle than the refracted light (33)). This can cause reflective and/or refractive "ghosting" of the image in these portions of the window, leading to problems such as decrease in accuracy, and/or a decrease in delivery of the intended light dose to the resin, for objects produced in these portions of the window.

3. Apparatus and Resin Cassettes Implementing Oxygen-Carrying Liquids.

Embodiments of apparatus and resin cassettes are shown in FIGS. 1-3. The apparatus typically includes a frame or chassis (17), a resin cassette (10) as described further below operatively associated with said frame (17) (typically by means of a cassette mount, not shown, a light source (e.g., 13) positioned below the resin cassette (10) and positioned for projecting an enlarged image through a window (11); a removable carrier platform (14), or a carrier platform engagement assembly (14a) on which the carrier platform can be mounted, positioned above the window (11) and operatively associated with the frame (17); and drive (15) operatively associated with a carrier platform (14) and the frame (17) and configured for advancing the carrier platform (14) and the resin cassette away (10) from one another (typically in the "Z" or vertical direction, and typically by moving the platform (14) upward and away from an otherwise stationary window).

Any suitable light source (13) can be used, such as one employing an ultraviolet light, projecting off of a micromirror array or through a liquid crystal display (LCD) panel.

The apparatus may include a controller (16), such as a general purpose computer, located on board the apparatus, on the cloud, or a combination thereof, operatively associated with the light source and drive, and including programming for carrying out additive manufacturing on the apparatus as is known in the art.

The cassette (10), as noted above, generally includes a light transmissive window (11) configured to pass the enlarged image therethrough, the window (11) having internal structures defining fluid flow passages therein, with the internal structures distributed across the length and width of said window, and with the internal structures creating reflective and refractive surfaces within said window; and a circumferential frame (12) connected to and surrounding said window, said window and frame together forming a well configured to receive a light polymerizable resin (e.g., 21). A variety of geometries for these internal structures can be employed: in some embodiments, internal structures comprise walls and the passages comprise laterally aligned (e.g., parallel) channels; in some embodiments the internal structures comprise pillars (of any shape, width, and length) and the passages may comprise regularly or irregularly intersecting channels. The channels themselves may be of any suitable profile, such as triangular and/or quadrangular (e.g., square, rectangular, parallelogram, etc.) in profile.

The cassette window can be constructed in any suitable manner, though preferably provides or includes an oxygen permeable top portion through which oxygen in fluid flow passages can pass through to resin on top of the window. In some embodiments, the window (11) comprises a sandwich of at least top portion (11a) an intermediate portion (11b), and a bottom portion (11e), with the internal structures formed in the intermediate portion.

In some embodiments, the window bottom portion, comprises glass, sapphire, quartz, or transparent aluminum (ALON).

In some embodiments, the window top portion comprises a polymer (e.g., an oxygen-permeable polymer such as an amorphous fluoropolymer), optionally with said fluorophore dispersed therein.

In some embodiments, the intermediate layer comprises a second polymer layer, such as a polydimethylsiloxane (PDMS) layer.

In some embodiments, the apparatus of FIG. 1 includes a detachable carrier platform (14) on which an object can be produced, and the carrier platform (14) may be removably coupled to a platform mount (14a). The resin cassette (10) is configured for carrying a light-polymerizable resin (22), and includes a light transmissive window (11) having a liquid inhibitor supply bed therein. The supply bed has an inlet and an outlet.

Figure 5:
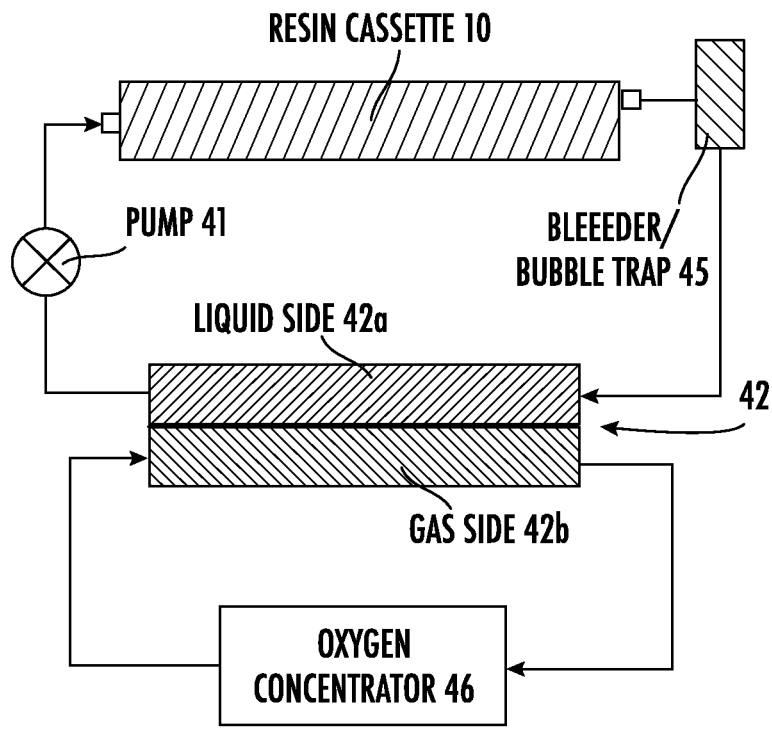
FIG. 5 schematically illustrates a system for replenishing oxygen in an oxygen-carrying liquid supplied to, and returned from, an additive manufacturing resin cassette.
Figure 6:
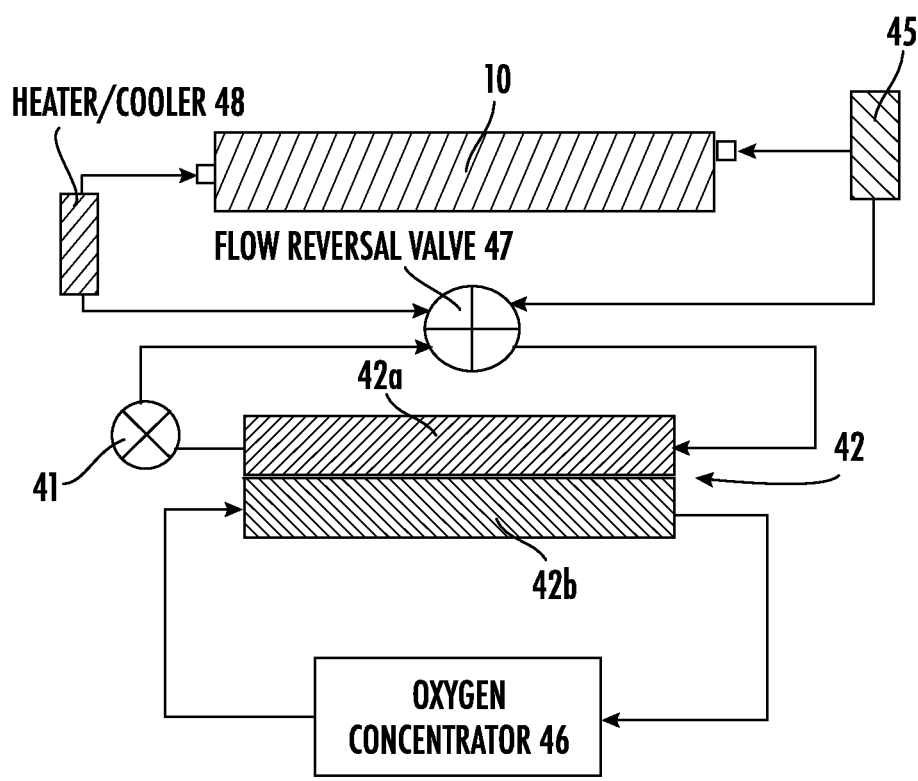
FIG. 6 schematically illustrates a system similar to that of FIG. 5, with flow reversal features and liquid heating/cooling features also included.
Figure 7:
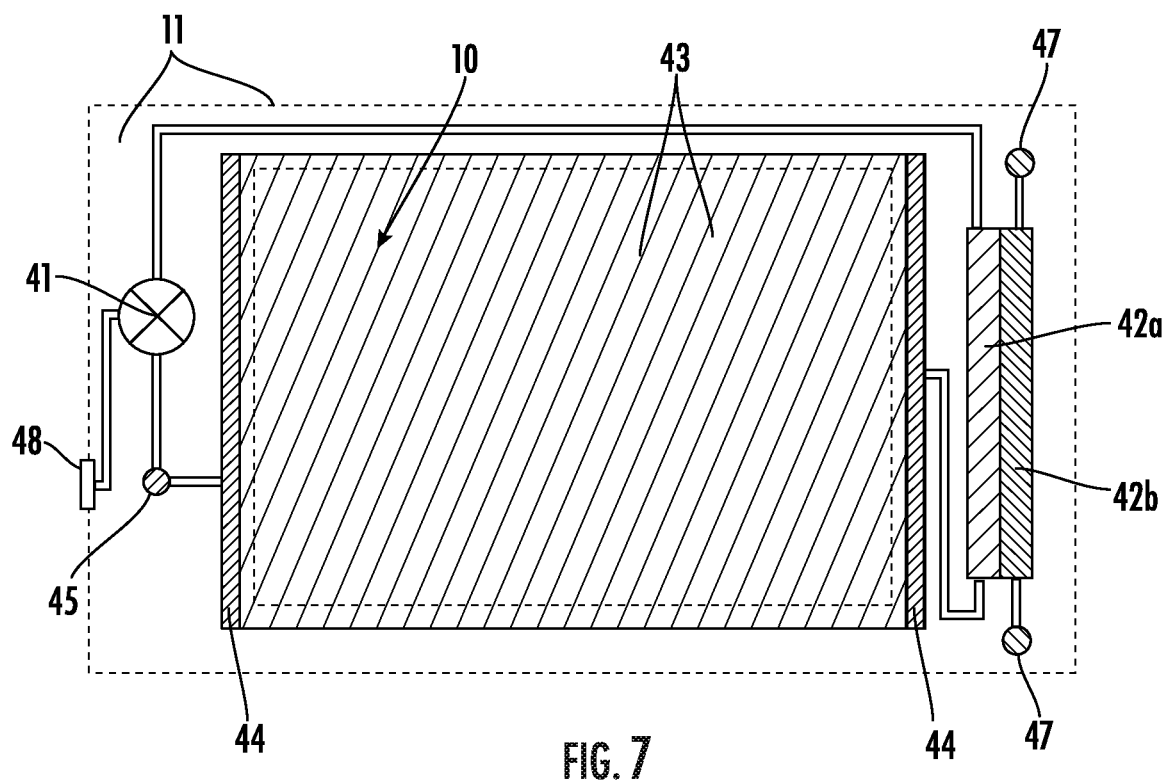
FIG. 7 is a top plan, cut away, schematic illustration of a resin cassette in which the oxygen carrying liquid is contained entirely therein.

As shown in FIGS. 5-7, the resin cassette (10) is connected to a gas exchanger (42) comprising a liquid side (42a), a gas side (42b), with an oxygen permeable barrier therebetween. The liquid side (42a) has an inlet and an outlet, with the supply bed inlet to the resin cassette (10) (or window) connected to the outlet of the liquid side (42a)t, and the supply bed outlet is connected to the inlet of the liquid side (42a). An oxygen carrying liquid is in the window supply bed (e.g., provided as part of the window in the resin cassette (10)) and the gas exchanger liquid side.

A pump (41) (e.g., such as an optionally reversable pump) is operatively associated with the supply bed of the window and the gas exchanger liquid side for circulating the oxygen carrying liquid therebetween, and an oxygen gas source (46) (e.g., an oxygen concentrator) is operatively associated with the gas exchanger gas side. In this configuration, gas from the oxygen concentrator (46) provides gas, such as oxygen, to the gas side (42b), which in turn provides gas (e.g., oxygen) to the liquid side 42a via the gas permeable barrier between the liquid side (42a) and the gas side (42b).

The oxygen carrying liquid may be a non-aqueous, or organic, liquid (e.g., a fluorocarbon, a silicone oil).

In some embodiments, the supply bed includes a plurality of channels. The window can include a sandwich of at least top portion (11a) an intermediate portion (11b), and a bottom portion (11e), and said supply bed is formed in said intermediate portion. In some embodiments, the window bottom portion includes glass, sapphire, quartz, or transparent aluminum (ALON).

In some embodiments, the top portion (11a) includes a polymer (e.g., an oxygen-permeable polymer such as an amorphous fluoropolymer), optionally with said fluorophore dispersed therein.

In some embodiments, the intermediate portion (11b) comprises a second polymer layer, such as a polydimethylsiloxane (PDMS) layer.

In some embodiments, the window, the pump, and the gas exchanger are operatively associated with one another by a liquid flow. The apparatus includes (i) a flow reversal valve (47) operatively associated with the liquid flow circuit and configured to reverse the flow of oxygen carrying liquid through said supply bed; and/or (j) a heater, a cooler, or both a heater and a cooler (48) operatively associated with the liquid flow circuit and configured to heat and/or cool the oxygen carrying liquid; and/or (k) a bleader valve or bubble trap (45) operatively associated with said liquid flow circuit to reduce to remove bubbles from the liquid.

In some embodiments, the resin cassette (10) includes a circumferential frame carried by and surrounding the window (11), and the pump (41) and the gas exchanger (42) are carried by the frame. In some embodiments, the liquid flow circuit, including the window (11), the cassette (10), the gas exchanger (42) (including the liquid side 42a and the gas side 42b), the bleeder/bubble trap (45), the pump (41) and the various inlets/outlets) are carried by or entirely contained within the frame.

In some embodiments, the chassis or frame (17) is operatively connected to the carrier platform, the light source, the drive, and the oxygen gas source, and the chassis and the resin cassette can be removably mounted, with the oxygen gas source operatively associated with the gas exchanger gas side through sealable connectors.

In some embodiments, a method of making an object (31) from a light polymerizable resin (21) and a data file (e.g., a CAD file, an .stl file, etc.) includes (a) filling a resin cassette in an apparatus as described herein with resin; and (b) producing the object from the data file and the resin by intermittently and/or continuously exposing the resin to an enlarged image (e.g., that is spatially and temporally modulated) from the light source to photopolymerize the resin, while advancing the carrier platform and said resin cassette away from one another.

The resin may be a dual cure resin.

In some embodiments, a resin cassette for manufacturing an object from a light polymerizable resin includes a light-transmissive window (11) having a liquid inhibitor supply bed therein, and the liquid supply bed has an inlet and an outlet. A circumferential frame surrounds the window, and the window and frame together form a well configured to receive a light polymerizable resin (22) A gas exchanger (42) is carried by the frame, and the gas exchanger includes a liquid side (42a), a gas side (42b), and an oxygen permeable barrier therebetween. The liquid side has an inlet and an outlet, and the supply bed inlet is connected to the liquid side outlet, and the supply bed outlet is connected to the liquid side inlet. An oxygen carrying liquid is in the liquid inhibitor supply bed and the gas exchanger liquid side. A pump (41) is carried by the frame, and the pump is operatively associated with the supply bed and the gas exchanger liquid side for circulating the oxygen carrying liquid therebetween. The gas connectors are on the frame and operatively associated with the gas exchanger gas side for connecting the gas side to an oxygen gas source (e.g., an oxygen concentrator).

In some embodiments, the pump (41) comprises a pneumatically actuated pump.

Any suitable oxygen gas source (46) can be used, such as an oxygen concentrator (see generally Feller and Griffin, PCT Patent Application Pub. No. WO 2019/084112, and Feller et al., PCT Patent Application Pub. No. WO 2018/006018).

The apparatus can optionally include heaters and/or coolers (48) operatively associated with the window and the controller. Any suitable devices can be used, including resistive heaters, Peltier coolers, infrared heaters, etc., including combinations thereof. The heaters/coolers are preferably directly included in the resin cassette, preferably in direct contact with the window itself, or in the case of infrared heaters (not shown) can be positioned to project into the resin through the window.

In use, the cassettes and apparatus described herein provide a method of making an object (21) from a light polymerizable resin (22) and a data file (e.g., a CAD file, an .stl file, etc.), by (a) filling a resin cassette in an apparatus of claim with a resin such as described above, and then (b) producing the object from said data file and said resin by intermittently and/or continuously exposing said resin to an enlarged image (e.g., that is spatially and temporally modulated) from said light source to photopolymerize said resin, while advancing said carrier platform and said resin cassette away from one another.

The foregoing is illustrative of the present invention, and is not to be construed as limiting thereof. The invention is defined by the following claims, with equivalents of the claims to be included therein.

We claim:

1. An apparatus for manufacturing an object from a light polymerizable resin, comprising: (a) a carrier platform on which an object can be produced; (b) a resin cassette configured for carrying a light-polymerizable resin, said cassette including a light-transmissive window, said window having a liquid inhibitor supply bed therein, said supply bed having an inlet and a supply bed inlet and a supply bed outlet; (c) a light source positioned beneath said resin cassette and configured for projecting an enlarged image through said window; (d) a drive operatively associated with said resin cassette and said carrier platform and configured for advancing said carrier platform and said resin cassette away from one another; (e) a gas exchanger comprising a liquid side, a gas side, and an oxygen permeable barrier therebetween; said liquid side having a liquid side inlet and a liquid side outlet, with said supply bed inlet connected to said liquid side outlet, and said supply bed outlet connected to said liquid side inlet; (f) an oxygen carrying liquid in said liquid inhibitor supply bed and said gas exchanger liquid side; and (g) a pump operatively associated with said liquid inhibitor supply bed and said gas exchanger liquid side for circulating said oxygen carrying liquid therebetween; and (h) an oxygen gas source operatively associated with said gas exchanger gas side.

2. The apparatus of claim 1, wherein the carrier platform is removably coupled to the apparatus.

3. The apparatus of claim 1, wherein said oxygen carrying liquid is a non-aqueous, or organic, liquid.

4. The apparatus of claim 1, wherein said liquid inhibitor supply bed comprises a plurality of channels.

5. The apparatus of claim 1, wherein said window comprises a sandwich of at least top portion an intermediate portion, and a bottom portion, and said liquid inhibitor supply bed is formed in said intermediate portion.

6. The apparatus of claim 5, where said window bottom portion comprises glass, sapphire, quartz, or transparent aluminum (ALON).

7. The apparatus of claim 5, wherein said top portion comprises a polymer with a fluorophore dispersed therein.

8. The apparatus of claim 5, wherein said intermediate portion comprises a second polymer layer comprising a polydimethylsiloxane (PDMS) layer.

9. The apparatus of claim 1, wherein said window, said pump, and said gas exchanger are operatively associated with one another by a liquid flow circuit, said apparatus further comprising:
 (i) a flow reversal valve operatively associated with said liquid flow circuit and configured to reverse the flow of oxygen carrying liquid through said liquid inhibitor supply bed; and/or
 (j) a heater, a cooler, or both a heater and a cooler operatively associated with said liquid flow circuit and configured to heat and/or cool said oxygen carrying liquid; and/or
 (k) a bleader valve or bubble trap operatively associated with said liquid flow circuit.

10. The apparatus of claim 1, said resin cassette further comprising a circumferential frame carried by and surrounding said window, wherein said pump and said gas exchanger are carried by said frame.

11. The apparatus of claim 10, further comprising a chassis operatively connected to said carrier platform, said light source, said drive, and said oxygen gas source, to which said chassis and said resin cassette can be removably mounted, with said oxygen gas source operatively associated with said gas exchanger gas side through sealable connectors.

* * * * *